(12) United States Patent
Maul

(10) Patent No.: US 6,199,129 B1
(45) Date of Patent: Mar. 6, 2001

(54) BUS SEGMENT OR BUS INTERFACE FOR CONNECTION OF A SUBASSEMBLY OF A PROGRAMMABLE CONTROLLER TO A BUS

(75) Inventor: Jürgen Maul, Sulzbach-Rosenberg (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/142,930
(22) PCT Filed: Mar. 6, 1997
(86) PCT No.: PCT/DE97/00433
§ 371 Date: Jan. 6, 1999
§ 102(e) Date: Jan. 6, 1999
(87) PCT Pub. No.: WO97/35260
PCT Pub. Date: Sep. 25, 1997

(30) Foreign Application Priority Data

Mar. 18, 1996 (DE) .............................. 196 10 556

(51) Int. Cl.⁷ ................................................... G06F 13/00
(52) U.S. Cl. ........................ 710/102; 714/721; 340/657
(58) Field of Search .............................. 710/62, 101–104, 710/107, 15; 714/719, 724, 725, 735, 721; 340/505, 657, 660, 661–664, 666

(56) References Cited

U.S. PATENT DOCUMENTS

| 5,099,391 | * | 3/1992 | Maggelet et al. ..................... 361/395 |
| 5,157,590 | * | 10/1992 | Barthel et al. ....................... 361/427 |
| 5,432,907 | * | 7/1995 | Picazo, Jr. et al. .................. 709/200 |
| 5,512,936 | * | 4/1996 | Burton et al. .......................... 348/11 |
| 5,903,160 | * | 5/1999 | Ianenko et al. ...................... 324/537 |
| 6,034,612 | * | 3/2000 | Heckel et al. ....................... 340/657 |

* cited by examiner

Primary Examiner—Thomas C. Lee
Assistant Examiner—Ri Jue Mai
(74) Attorney, Agent, or Firm—Kenyon & Kenyon

(57) ABSTRACT

In order, in the case of a programmable logic controller having a modular structure, to be able to insert and withdraw assemblies even in the course of operation, without disturbing the data traffic taking place via the bus of the programmable logic controller, provision is made for arranging an evaluation circuit in a bus segment or a bus access circuit. The evaluation circuit establishes whether an assembly is connected to the bus and accordingly controls a variable resistor, which is arranged in one of the supply lines for the assembly, to have a high resistance or a low resistance.

4 Claims, 3 Drawing Sheets

BUS SEGMENT OR BUS INTERFACE FOR CONNECTION OF A SUBASSEMBLY OF A PROGRAMMABLE CONTROLLER TO A BUS

FIELD OF THE INVENTION

The present invention relates to a bus segment and bus access circuit for connecting an assembly of a programmable logic controller to a bus.

BACKGROUND INFORMATION

International Patent Application No. WO 93/15459 describes a bus access circuit. German Patent Nos. DE 36 03 750 and DE 36 03 751 describe bus segments and bus access circuits that are frequently used in programmable logic controllers having a modular structure.

In the case of such a programmable logic controller having a modular structure, it may be necessary to insert or withdraw assemblies in the course of operation. However, the insertion or withdrawal may give rise to the occurrence of feedback to the bus which connects the assemblies to one another, which feedback disturbs the bus traffic. In order to avoid such disturbances, provision is customarily made in the prior art for providing leading and/or lagging contacts on the assembly, which is provided with an evaluation circuit and a variable resistor (typically a MOSFET), with the result that the assembly is electrically connected to the bus only after complete insertion and is already electrically isolated from the bus before complete withdrawal.

This procedure is disadvantageous insofar as at least the evaluation circuit must be supplied with power from the outset. However, even the connection of the evaluation circuit to the power supply can already bring about disturbances to the voltage supply of the bus, to be precise particularly when a fault occurs in the evaluation circuit or the voltage supply of the evaluation circuit. A short circuit of the two supply contacts, for example, of the assembly, by means of which the evaluation circuit is supplied with power, would ineluctably lead to a complete collapse of the power supply of the entire bus. The same consequence would emerge if other, external effects on the plug-in location for the assembly caused the supply contacts of the plug-in location to be short-circuited to one another. This case may occur particularly when an assembly which, although it can be inserted mechanically into the plug-in location, is not, however, electrically and functionally intended for this plug-in location is inserted into the plug-in location.

SUMMARY OF THE INVENTION

The object of the present invention consists in providing a bus segment and a bus access circuit by means of which negative feedback to the bus is avoided under all circumstances.

A bus segment and a bus access circuit ensure, in particular, that an inserted assembly is supplied with power only when all the contacts, i.e., the signal contacts as well, are inserted into the plug-in location and the contacts thereof, and, furthermore, the assembly is isolated from the bus again if it is operating defectively or is not intended for this plug-in location.

The measure yields particularly smooth and hence disturbance-free coupling of the assembly to the bus.

DETAILED DESCRIPTION

Figure 1:
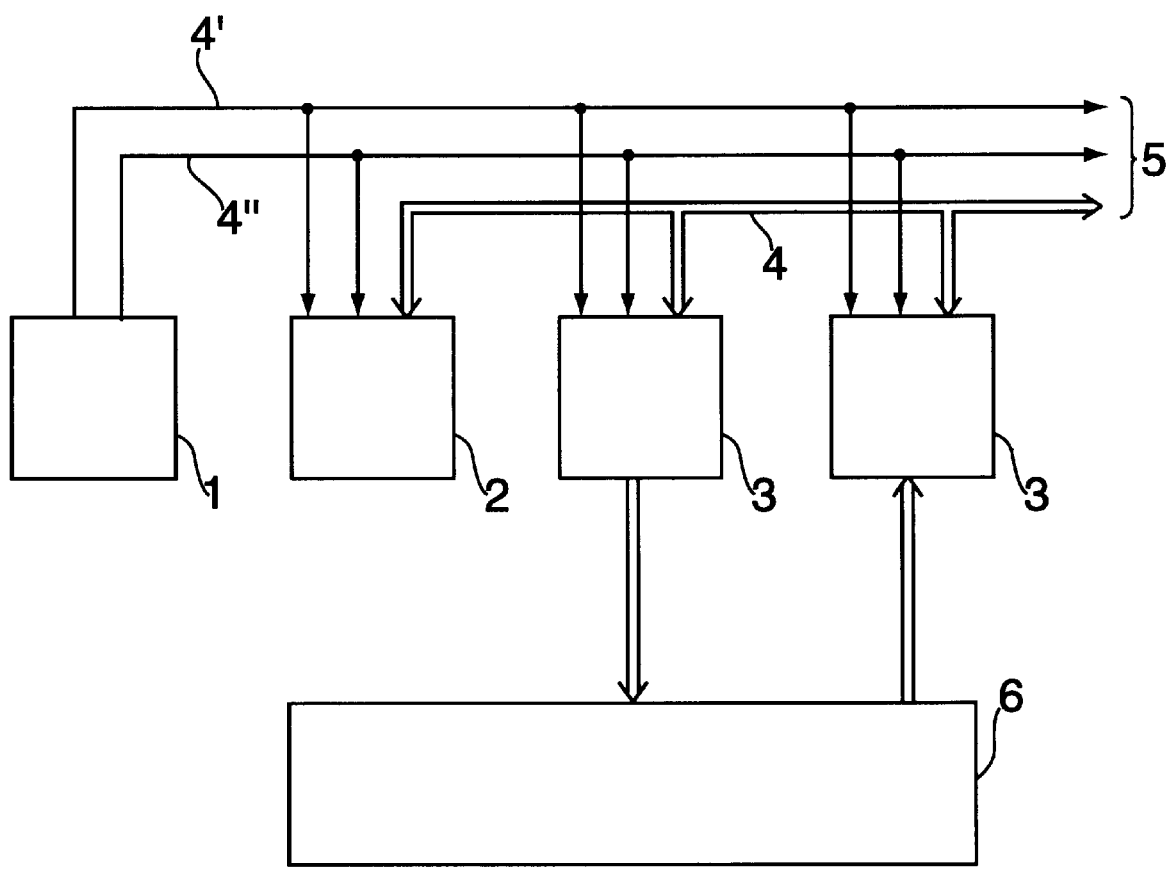
FIG. 1 shows a modular programmable logic controller.

In accordance with FIG. 1, a modular programmable logic controller comprises a power supply assembly 1, a central processing unit 2 and peripheral assemblies 3. The peripheral assemblies 3 may be, for example, digital or analog input and/or output assemblies. Furthermore, the peripheral assemblies may also be hybrid input/output assemblies or intelligent functional modules. Via the peripheral assemblies 3, the central processing unit 2 controls and monitors a technical process 6, for example a chemical installation or a hydraulic press.

The central processing unit 2 and the assemblies 3 are for this purpose connected to one another in terms of data technology via the control bus 4. The central processing unit 2 and the peripheral assemblies 3 are furthermore supplied with electrical energy via the supply lines 4', 4". A common earth connection is established via the supply line 4"; the supply line 4' usually carries a potential of +5 volts. The control bus 4 and supply lines 4', 4" together form the backplane bus 5 of the programmable logic controller.

In the example above, only two peripheral assemblies 3 are illustrated. Alternatively, the programmable logic controller could have more assemblies, for example 5, 8, 10 .... Moreover, the control bus 4 may be designed as required.

Thus, the control bus 4 may be, for example, a serial bus comprising just one clock line and one data line. However, the control bus 4 could also be a parallel bus comprising a multiplicity of address, data and control lines. The concrete structure of the control bus 4 is of secondary importance within the context of the present invention. In every case, however, the lines of the control bus 4 form the signal lines of the present invention.

Figure 2:
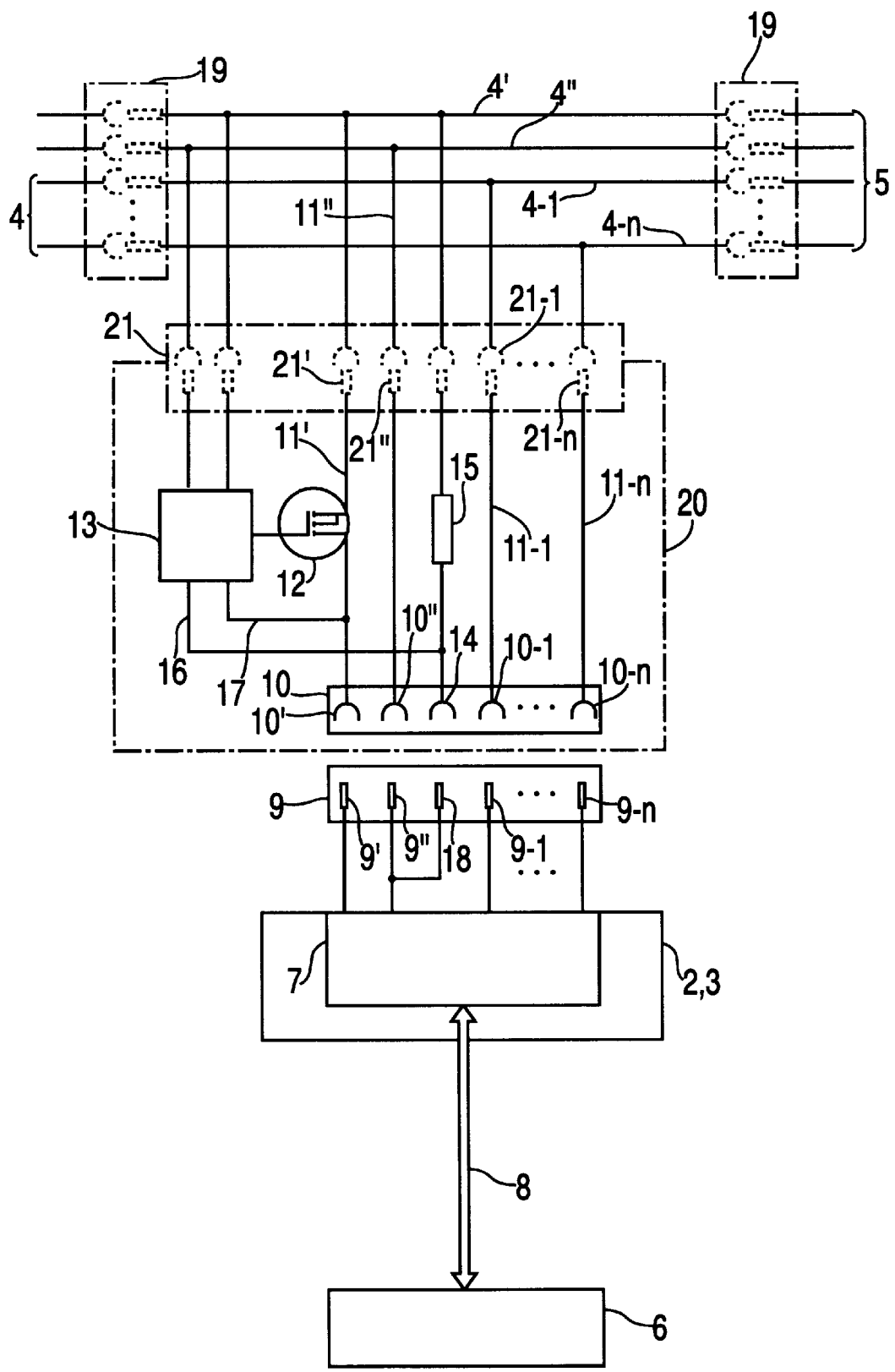
FIG. 2 shows the connection of an assembly of the programmable logic controller to the bus.

FIG. 2 now shows the connection of the central processing unit 2 or of the peripheral assemblies 3 to a bus segment of the bus 5. As is immediately evident from FIG. 2, the assembly 2, 3 connected to the bus 5 has an internal circuit 7. In the case of a peripheral assembly, the said circuit 7 is, moreover, connected to the technical process 6 via the process lines 8. In every case, however, the assembly is inserted into a plug-in location 10 via the plug-in connection 9 and connected to the bus 5 in this way.

As is furthermore immediately evident from FIG. 2, the assembly 2, 3 is coupled in terms of data technology to the bus 5 directly via the assembly signal contacts 9-1 to 9-n and the plug-in location signal contacts 10-1 to 10-n, which are connected via the signal spur lines 11-1 to 11-n to the signal lines 4-1 to 4-n of the control bus 4.

The power supply of the assembly 2, 3, on the other hand, takes place via the assembly supply contacts 9', 9", which are inserted into the plug-in location supply contacts 10', 10". The plug-in location supply contacts 10', 10" are connected via the supply spur lines 11', 11" to the supply lines 4', 4". A MOSFET 12 is in this case arranged in the supply spur line 11'. The volume resistance of the MOSFET 12 is, as is known, variable and adjustable within wide limits. The MOSFET 12 therefore represents the variable resistor of the present invention.

The MOSFET 12 is controlled to have a high resistance or low resistance by the evaluation circuit 13, which is likewise connected to the supply lines 4', 4", in accordance with the signals which are fed to the evaluation circuit 13.

As is furthermore evident from FIG. 2, the plug-in location 10 has a test contact 14, which is connected via the pull-up resistor 15 to the supply line 4'. The potential present at the test contact 14 is fed to the evaluation circuit 13 via the test contact line 16. Furthermore, the potential present at the supply contact 10' is additionally fed to the evaluation circuit 13 via the supply contact line 17.

The present invention is based on the fact that the potential of the supply line 4' is present at the test contact 14, on account of the pull-up resistor 15, if the assembly 2, 3 has not been inserted into the plug-in location 10. If, on the other hand, the assembly 2, 3 has been inserted into the plug-in location 10, the test contact 14 is connected directly to the supply line 4" via the plug-in location supply contact 10", the assembly supply contact 9" and the mating test contact 18 directly connected to the latter, with the result that in this case the other supply potential is present at the evaluation circuit 13.

As a result, the evaluation circuit 13 can evaluate the potential present at the test contact 14 and control the variable resistor 12 to have a low resistance or high resistance, depending on whether or not the assembly 2, 3 has been inserted into the plug-in location 10. Furthermore, by evaluating the potential present on the supply contact line 17, it is possible to establish whether the supply potential is collapsing on account of the insertion of the assembly 2, 3. In this case, the MOSFET 12 is then controlled to have a high resistance again, with the result that the assembly 2, 3 is isolated from the bus 5. As a result, the other assemblies connected to the bus 5 can continue to be operated.

The exact method of operation of the evaluation circuit 13 will now be explained below with reference to FIGS. 3 to 5.

Figure 3:
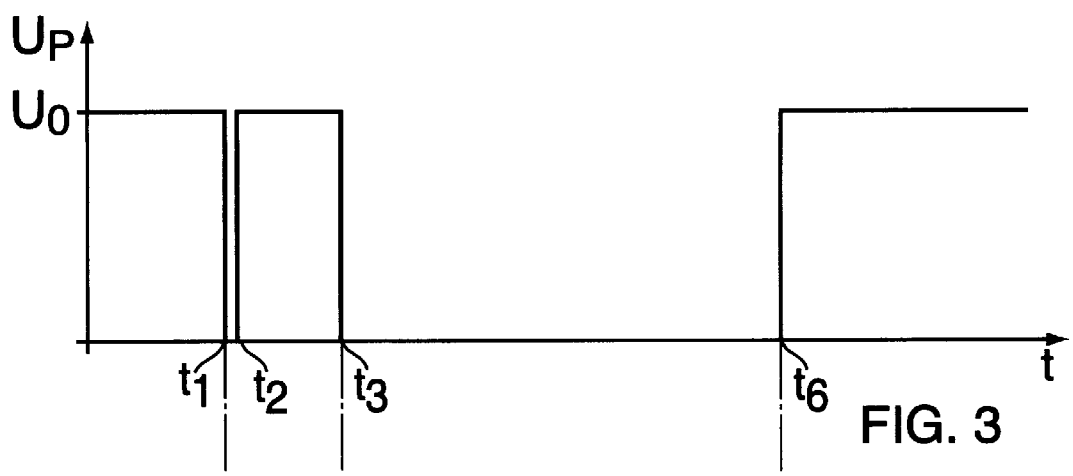
FIG. 3 shows the voltage characteristic at the test contact.
Figure 4:
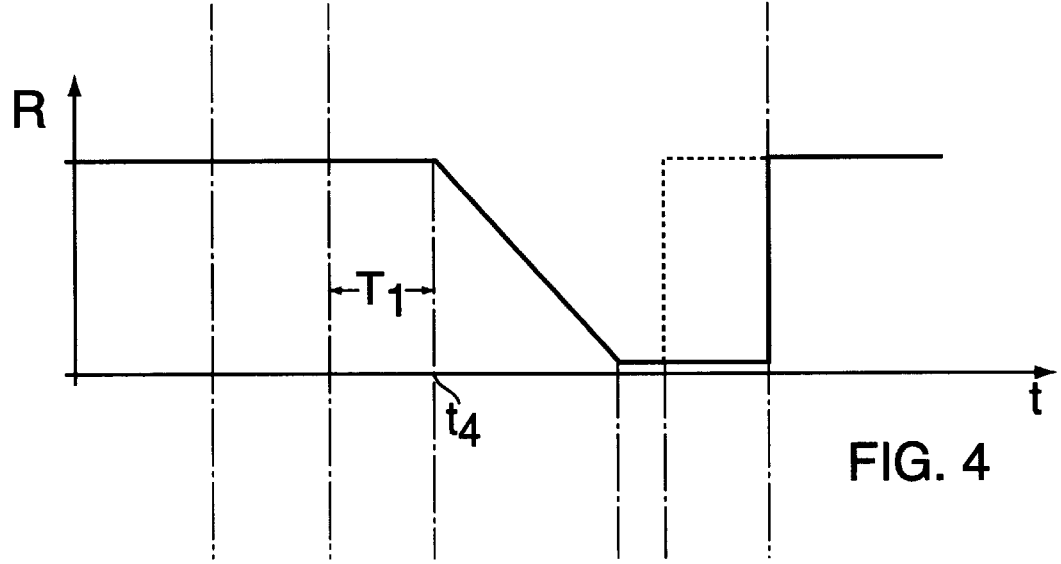
FIG. 4 shows the resistance characteristic of the variable resistor.
Figure 5:
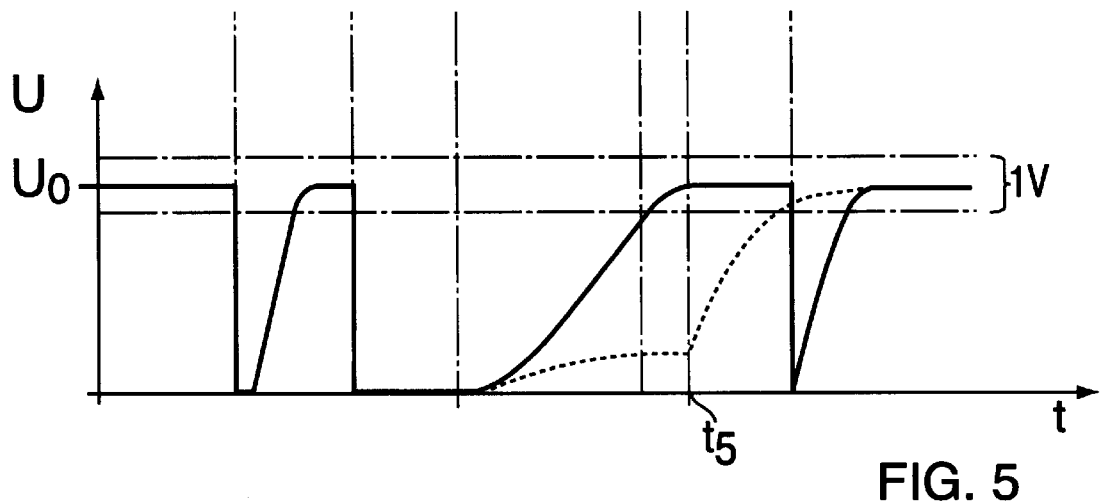
FIG. 5 shows the voltage characteristic at one of the supply contacts.

On the ordinate, the voltage $U_p$ present at the test contact is plotted in FIG. 3, the resistance R of the MOSFET 12 is plotted in FIG. 4 and the voltage U of the supply contact 10' is plotted in FIG. 5. The time t is plotted in each case on the abscissa.

As long as the potential $U_p$, which is fed to the evaluation circuit 13 via the test contact line 16, of the test contact 14 corresponds, in accordance with FIG. 3, to the supply voltage $U_0$ of, for example, 5 volts, the MOSFET 12 is driven by the evaluation circuit 13 in such a way that it has a high resistance, as illustrated in FIG. 4. When the potential momentarily drops to 0 volts at the instant $t_1$ and rises to 5 volts again at the instant $t_2$, the MOSFET 12 likewise continues to have a high resistance, since the MOSFET is controlled to have a low resistance only when the potential Up present at the test contact 14 approximately corresponds to the (earth) potential of the supply line 4" in an uninterrupted manner during a previously determined waiting time $T_1$.

Such a brief drop in the potential $U_p$ present at the test contact 14 can happen, for example, due to so-called contact bounce when the assembly 2, 3 is inserted.

Although, in accordance with FIG. 5, the potential U transmitted via the supply contact line 17 at this instant likewise collapses, this is irrelevant for the driving of the MOSFET 12 at this instant.

At a later instant $t_3$, the assembly 2, 3 is definitively inserted into the plug-in location 10. As a result, the running of the waiting time $T_1$ is initiated. After this waiting time $T_1$ has elapsed, the MOSFET 12 is, as illustrated in FIG. 4, gradually controlled to have a low resistance. Accordingly, the resistance of the MOSFET 12 decreases from the instant $t_4$, and the voltage U present at the supply contact 10' rises.

At an instant $t_5$, the evaluation circuit 13 tests whether the potential U present at the supply contact 10' approximately corresponds to the supply potential $U_0$ of the supply line 4'. In the present case, it is tested whether the potential present at the supply contact 10' deviates by a maximum of 0.5 volts above or below the desired potential $U_0$=5 volts. If the measured potential U lies within this value range, the resistor 12 continues to have a low resistance. It acquires a high resistance again (at the instant $t_6$) only when the test potential $U_p$ rises again to the supply potential $U_0$.

If, on the other hand, as illustrated by dashed lines in FIGS. 4 and 5, the potential U present at the supply contact 10' lies outside the predetermined value range (in the present case, for example, outside the range of 4.5 to 5.5 volts) at the instant $t_5$, this is assessed as a defective connection of the assembly 2, 3 to the bus 5. In this case, the evaluation circuit 13 immediately controls the resistor 12 to have a high resistance again (see dashed line in FIG. 4). A flag is in this case set in the evaluation circuit 13 and prevents renewed controlling of the MOSFET 12 to have a low resistance until the assembly 2, 3 is withdrawn again from the plug-in location 10. The flag is therefore reset only at the instant $t_6$.

The time interval between $t_5$ and $t_4$ is the so-called stabilization time $T_2$.

In accordance with the circuit illustrated in FIG. 2, the plug-in location 10, the evaluation circuit 13, the MOSFET 12 and the pull-up resistor 15 and the corresponding lines are part of the backplane bus 5. In particular, the evaluation circuit 13, the MOSFET 12 and the resistor 15 are assigned to the bus segment in which the plug-in location 10 is arranged. The backplane bus 5 then has a plurality of such circuits, namely one circuit per plug-in location 10.

As an alternative, the backplane bus 5 itself could also have a modular structure, with the result that it comprises individual bus segments which can be connected to one another. This is indicated in FIG. 2 by virtue of the fact that plug-in connections 19 drawn with dashed lines are indicated.

It would equally be possible to arrange the evaluation circuit 13, the MOSFET 12 and the resistor 15 together with associated interconnections and the plug-in location 10 in a dedicated bus access circuit 20, which can be plugged onto the bus 5, with the result that the access circuit is arranged between the assembly 2, 3 and the bus 5. This is also illustrated diagrammatically in FIG. 2. In this case, the bus access circuit 20 also has, in addition to the plug-in location 10 for the assembly 2, 3, a bus connection 21 with contacts 21', 21", 21-1 to 21-n. The contacts 21' and 10' are then again connected to one another via the connection line 11'; the same applies analogously to the contacts 21" and 10" and the contacts 21-1 and 10-1 to 21-1 and 10-n.

However, the functionality of the circuit always remains the same, irrespective of the concrete structure.

What is claimed is:

1. A bus segment for connecting an assembly of a programmable logic controller to a bus, comprising:
    a first supply line;
    a second supply line;
    a signal line; and
    a plug-in location for inserting the assembly, the plug-in location including a first supply contact, a second supply contact, a signal contact and at least one test contact, the at least one test contact connected to the first supply line via a pull-up resistor and being connectable to the second supply line via the assembly, the first supply line being connected to the first supply contact of the plug-in location via a first spur line, the second supply line being connected to the second supply contact of the plug-in location via a second spur line, and the signal line being connected to the signal contact via a third spur line, the first spur line including a variable resistor; and an evaluation circuit connected to the plug-in location, the first supply line, the second supply line and the first supply contact of the plug-in location, the evaluation circuit evaluating a potential at the at least one test contact and controlling the variable resistor to have a high resistance if the potential at the at least one test contact approximately corresponds to a potential of the first supply line, the evaluation circuit further controlling the variable resistor to have a low resistance only when the potential at the test contact approximately corresponds to the potential of the second supply line and a potential of a supply contact of a bus connection in an uninterrupted manner during a predetermined waiting time, the evaluation circuit further controlling the variable resistor to have the high resistance, if, after a predetermined stabilization time, the potential of the first supply contact of the plug-in location is outside a predetermined value range.

2. The bus segment according to claim 1, wherein the evaluation circuit gradually controls the variable resistor to have the low resistance.

3. A bus access circuit for connecting an assembly of a programmable logic controller to a bus, comprising:

at least one bus connection connecting to the bus including a first supply contact, a second supply contact, and a signal contact;

a plug-in location for inserting the assembly, the plug-in location including a first supply contact, a second supply contact, a signal contact and at least one test contact, the at least one test contact connected to the first supply line via a pull-up resistor and being connectable to the second supply contact of the at least one bus connection via the assembly, the first supply contact of the at least one bus connection being connected to the first supply contact of the plug-in location via a first connection line, the second supply contact of the at least one bus connection being connected to the second supply contact of the plug-in location via a second connection line, and the signal contact of the at least one bus connection being connected to the signal contact of the plug-in location via a third connection line, the first connection line including a variable resistor; and an evaluation circuit connected to the plug-in location, the first supply contact and the second supply contact of the plug-in location, the evaluation circuit evaluating a potential at the at least one test contact and controlling the variable resistor to have a high resistance if the potential at the at least one test contact approximately corresponds to a potential of the first supply contact of the at least one bus connection, the evaluation circuit further controlling the variable resistor to have a low resistance only when the potential at the test contact approximately corresponds to the potential of a supply line and a potential of the second supply contact of the at least one bus connection in an uninterrupted manner during a predetermined waiting time, the evaluation circuit further controlling the variable resistor to have the high resistance, if, after a predetermined stabilization time, the potential of the first supply contact of the plug-in location is outside a predetermined value range.

4. The bus access circuit according to claim 3, wherein the evaluation circuit gradually controls the variable resistor to have the low resistance.

* * * * *